United States Patent
Simkine

(10) Patent No.: US 7,808,556 B2
(45) Date of Patent: Oct. 5, 2010

(54) IMAGE PROCESSING DEVICE

(75) Inventor: Antoine Simkine, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 850 days.

(21) Appl. No.: 10/983,365

(22) Filed: Nov. 8, 2004

(65) Prior Publication Data

US 2006/0098123 A1    May 11, 2006

(51) Int. Cl.
H04N 17/00 (2006.01)
H04N 17/02 (2006.01)
H04N 5/45 (2006.01)
H04N 5/222 (2006.01)
H04N 9/67 (2006.01)

(52) U.S. Cl. .................. 348/602; 348/189; 348/656; 348/722

(58) Field of Classification Search ............... 348/722, 348/744, 602–603, 659–661, 180, 182, 184, 348/189

See application file for complete search history.

(56) References Cited

U.S. PATENT DOCUMENTS

| | | | | |
|---|---|---|---|---|
| 5,406,305 A * | 4/1995 | Shimomura et al. | ......... | 345/102 |
| 5,517,237 A * | 5/1996 | Cocanour, III | ............ | 348/189 |
| 5,933,130 A * | 8/1999 | Wagner | ............ | 345/690 |
| 6,167,193 A * | 12/2000 | Birdsell et al. | ............ | 392/365 |
| 6,335,761 B1 * | 1/2002 | Glen et al. | ............ | 348/557 |
| 6,388,716 B1 * | 5/2002 | Tsuzuki et al. | ............ | 348/687 |
| 6,448,715 B1 * | 9/2002 | Fujiwara et al. | ............ | 315/129 |
| 6,452,627 B1 * | 9/2002 | Hamaguri et al. | ............ | 348/180 |
| 6,459,436 B1 * | 10/2002 | Kumada et al. | ............ | 345/590 |
| 6,611,297 B1 * | 8/2003 | Akashi et al. | ............ | 348/739 |
| 6,621,526 B1 * | 9/2003 | Yamagishi | ............ | 348/659 |
| 6,633,301 B1 * | 10/2003 | Dallas et al. | ............ | 345/597 |
| 6,717,625 B1 * | 4/2004 | Thielemans | ............ | 348/745 |
| 6,727,489 B2 * | 4/2004 | Yano | ............ | 250/221 |
| 6,771,323 B1 * | 8/2004 | Dean et al. | ............ | 348/722 |
| 6,838,659 B2 * | 1/2005 | Kanai | ............ | 250/226 |
| 6,958,785 B2 * | 10/2005 | Orfitelli et al. | ............ | 348/745 |
| 7,023,496 B2 * | 4/2006 | Nagata et al. | ............ | 348/673 |
| 7,046,255 B2 * | 5/2006 | D'Souza et al. | ............ | 345/602 |
| 7,049,575 B2 * | 5/2006 | Hotelling | ............ | 250/214 AL |
| 7,050,121 B2 * | 5/2006 | Kim | ............ | 348/744 |
| 7,073,909 B2 * | 7/2006 | Lerner | ............ | 353/20 |
| 7,236,154 B1 * | 6/2007 | Kerr et al. | ............ | 345/102 |
| 7,298,289 B1 * | 11/2007 | Hoffberg | ............ | 340/903 |
| 2003/0016247 A1 * | 1/2003 | Lai et al. | ............ | 345/764 |
| 2003/0095093 A1 * | 5/2003 | Pirhonen | ............ | 345/102 |

(Continued)

Primary Examiner—Brian P Yenke
(74) Attorney, Agent, or Firm—Robert D. Shedd; Robert B. Levy; Wan Yee Cheung

(57) ABSTRACT

The invention provides a video system comprising at least one input for receiving incoming video data and at least one output for delivering outgoing video data to a display device. The system further comprises at least one processor for converting the incoming video data into outgoing video data as a function at least of one item of information delivered by a detecting element. According to an embodiment of the invention, the detecting element is suitable for measuring at least one colorimetric characteristic of an image produced by the display device. According to another embodiment of the invention, the processor converts incoming video data into outgoing video data as a function at least of one item of information delivered by a user. In one embodiment of the invention, the information delivered by the user represents a desired calorimetric response for different incoming data.

16 Claims, 1 Drawing Sheet

U.S. PATENT DOCUMENTS

| | | | |
|---|---|---|---|
| 2003/0231260 A1* | 12/2003 | Pate et al. | 348/744 |
| 2004/0165068 A1* | 8/2004 | Jane | 348/189 |
| 2005/0068332 A1* | 3/2005 | Diefenbaugh et al. | 345/604 |
| 2005/0116952 A1* | 6/2005 | Je et al. | 345/426 |
| 2006/0098123 A1* | 5/2006 | Simkine | 348/603 |
| 2006/0171704 A1* | 8/2006 | Bingle et al. | 396/419 |

* cited by examiner

IMAGE PROCESSING DEVICE

FIELD OF THE INVENTION

The present invention generally relates to video image processing systems, devices and methods.

BACKGROUND OF THE INVENTION

Every display device has a characteristic response. Accordingly, the rendering of the images generated from identical video data by projectors made by different manufacturers will not always be the same. Consequently, the rendering of a motion picture on the display may not be the rendering approved by the director.

Moreover, the ambient light conditions in which display takes place are not always ideal and may affect the appearance of the displayed images. In particular, projectors vary in regard to output, and a higher environmental light level may be tolerated with the brightest projectors. It may prove difficult for a person to determine the acceptable degree of ambient lighting that will not compromise image quality to an inordinate extent. There is a need to improve or modify the rendering of projected images, for example to approximate more closely the appearance that has been approved by the director.

SUMMARY OF THE INVENTION

The invention provides a video system comprising at least one input for receiving incoming video data and at least one output for delivering outgoing video data to a display device. The system further comprises at least one processor for converting the incoming video data into outgoing video data as a function at least of one item of information delivered by a detecting element. According to an embodiment of the invention, the detecting element is suitable for measuring at least one colorimetric characteristic of an image produced by the display device. According to another embodiment of the invention, the processor converts incoming video data into outgoing video data as a function at least of one item of information delivered by a user.

BRIEF DESCRIPTION OF THE DRAWINGS

Preferred embodiments of the present invention will be described below in more detail, with reference to the accompanying drawings, in which.

DETAILED DESCRIPTION

Figure 1:
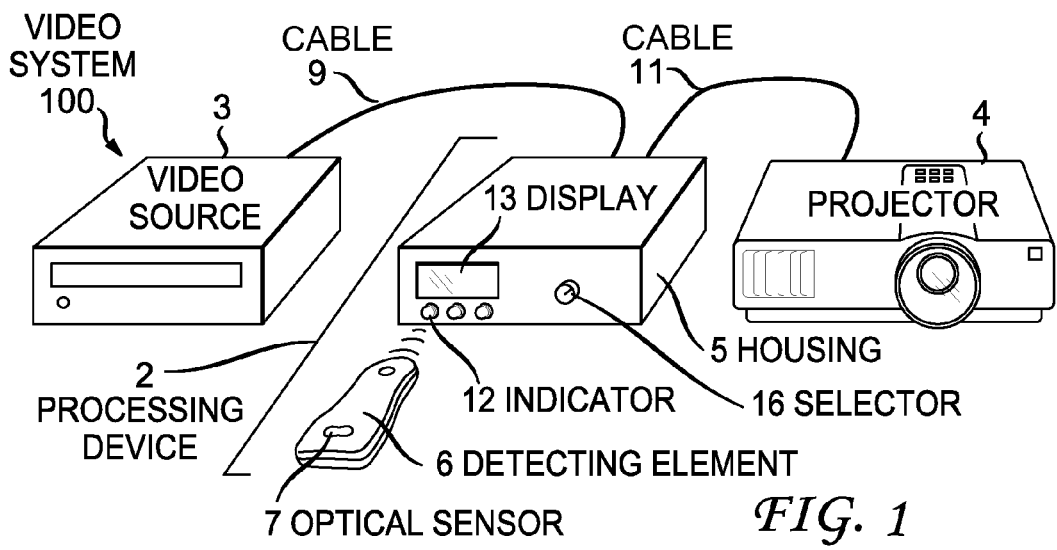
FIG. 1 is a partial schematic view of a "home theater" system comprising a data processing device realized according to the invention.

An embodiment of the invention comprises a home theatre system. In one embodiment of the invention, a home theatre system comprises a video source for providing video data representing images to be displayed. Video sources include, for example, DVD optical disk players and demodulators. The video source is coupled to a receiver, for example via cable, satellite, antenna, Internet connection, wireless connection and the like. The receiver is coupled to a display system. In one embodiment of the invention, a display system comprises a projector and an associated screen.

Display devices, for example, projectors, have characteristic responses. That is, the rendering of the images generated from identical video data by display devices made by different manufacturers will not always be the same. Consequently, the rendering of a film on the display device may not be the rendering approved by the director.

Moreover, the ambient light conditions in which display takes place are not always ideal and may affect the appearance of the displayed images. Display devices, for example, projectors, vary in regard to light output. Higher environmental light levels are sometimes tolerated with bright projectors. It may prove difficult for a person to determine the acceptable degree of ambient lighting that will not compromise image quality. There is a need to improve or modify the rendering of projected images, for example to approximate more closely the projection conditions that have been approved by the director.

Further embodiments of the invention comprises cinema laboratories, digital intermediate processing systems and the like. One embodiment of the invention comprises a scanner, for example, a silver film scanner, an imager and a display system. In one embodiment of the invention, the display system is a projection system comprising a digital projector. The invention allows system operation such that the images displayed on the display, for example, the screen of the laboratory's projection system, and the images approved by the director correspond as faithfully as possible to those obtained on target display devices. Target display devices include, for example, projection systems in theater screening rooms, "home theater" systems, and digital cinema theatres, to name but a few.

The invention is directed to a video system comprising at least one input for receiving incoming video data and at least one output for delivering outgoing video data to a display device. The system further comprises at least one processor for converting the incoming video data into outgoing video data as a function at least of one item of information delivered by a detecting element. According to an embodiment of the invention, the detecting element is suitable for measuring at least one calorimetric characteristic of an image produced by the display device. According to another embodiment of the invention, the processor converts incoming video data into outgoing video data as a function at least of one item of information delivered by a user. In one embodiment of the invention, the information delivered by the user represents a desired colorimetric response for different incoming data.

The term "video data" refers to at least one item of information relating to a video image. Video data includes, for example, supplemental information related to the soundtrack. Video data refers to both analog and digital data. According to one embodiment of the invention, video data is transmitted according to one of the following standards: PAL, RGB, YUV, SVHS, SDI, HDSDI, USB, FIREWIRE, VGA, SGA, XGA. Other formats are suitable.

The term "processor" refers to any processing system for digital data or analog data. According to various embodiments of the invention, a processor includes one or more microprocessors, memories, graphic cards, analog-to-digital converters, etc. According to embodiments of the invention a processor is integrated into a device, for example, a computer, a projector or a television set.

In one embodiment of the invention, the display device comprises a projection system including a projector and a screen. According to other embodiments of the invention, the display device comprises at least one device selected from the group comprising: cathode-ray-tubes, liquid-crystal displays, liquid crystal on silicon (LCOS) displays, and Spatial Light Modulated (SLM) displays.

The term "projector" likewise refers to projectors associated with screens used in both reflection and transmission, for "home theater" systems, theater screening rooms or cinema laboratories. One embodiment of a projector comprises, for example, a halogen lamp and a set of colored liquid-crystal matrices or plural colored light sources and a set of mirrors, each of which is controlled in movement, for example by means of a piezoelectric motor.

By means of the invention, video data are processed before they are sent to the display device such that specific calorimetric characteristics of the display device are factored in. For instance, the video data, for example, is processed before being sent to the display device in such manner as to yield the desired overall response for the processing device and the display device.

In an embodiment of the invention, the device is housed for example, in a case. The case includes connectors for coupling to the processor in order to transmit and receive the incoming video data and the outgoing video data.

In one embodiment, the device comprises at least one indicator to show whether a predetermined ambient light condition for the projection of a film is met. To this end, the detecting element comprises, for example, a sensor configured to measure ambient light intensity. According to one embodiment of the invention, the detecting element is movable relative to the processor. Alternativelly, the detecting element is fixed in relation to the processor. When the detecting element is movable, one embodiment of the invention comprises a wireless lind for coupling the detecting element to the processor.

In on embodiment of the invention, the device inlcudes a selector for allowing a user to choose among plural processing options for the incoming video data, depending on the rendering desired by the user. The detecting element comprises a sensor configured to measure, for example, the red, green and blue levels in the projected image.

According to one embodiment of the invention, the processor is configured to send the display device reference data permitting the display of at least one image serving to perform measurements on the screen of the display device. The processor is configured to determine the response of the display device as a function of at least one item of information transmitted by the detecting element when the aforesaid image is displayed.

One embodiment of the invention is directed to a "home theater" system. The home theatre system comprises a video source comprising an optical disk player or a video data receiver and a projection system comprising a projector and a screen. A video data processing device receives data from the source and transmits the data, after processing, to the projector.

According to another embodiment of the invention, a theater screening room comprises a video source comprising a player of a medium on which video data are recorded. Alternatively, the video source comprises a video data receiver. At least one projection system comprises a projector and a screen disposed in the screening room. At least one video data processing device as defined hereinabove, receives data from the source and transmits the data, after processing, to the projector.

Another embodiment of the invention is directed to a video data processing method. The method comprises, converting incoming video data into outgoing video data by the application of a correction function that factors in the colorimetric response of at least one device, such as a digital projector, to which the outgoing data are being sent.

The term "calorimetric response" refers to the color actually produced by the device when it receives a corresponding data item. According to some embodiments of the invention, the calorimetric response refers to the steady-state response, i.e., the response of the device when the incoming data item is invariable over time, which is the case, for example, when the image remains the same during projection.

An example embodiment of a display environment, in this case a home theatre system 100, is illustrated in FIG. 1. Home theatre system 100 comprises a processing device 2 realized according to the invention, configured to receive incoming video data from a video source 3, for example a DVD optical disk player or a demodulator or decoder, and to supply outgoing video data to a display device. In the example of FIG. 1 the display device comprises a projection system that includes a projector 4 and an associated screen (not shown). Other display devices suitable for use in home theatre system 100 include non projection display devices.

According to one embodiment of the invention, processing device 2 includes a housing 5 and further comprises a detecting element 6 that is movable in relation to housing 5. Detecting element 6 comprises at least one optical sensor 7. Detecting element 6 is configured, in the example considered, to transmit data from sensor 7 to housing 5 via a wireless, radio or infrared link. According to an alternative embodiment of the invention, detecting element 6 is provided integral with housing 5, source 3 and projector 4. According to an embodiment of the invention, detecting element 6 comprises an optical sensor. In one embodiment of the invention, the optical sensor is associated with a sensing system for sensing light characteristics of images displayed on the display, and for determining and measuring characteristics of a displayed image characteristics based on the sensed light.

Figure 2:
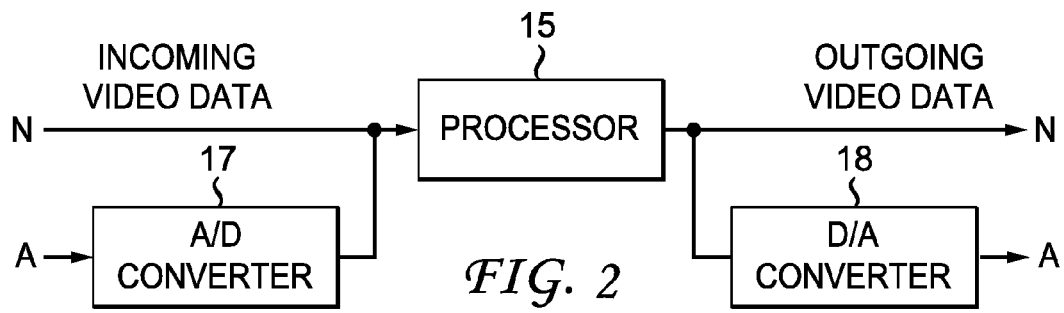
FIG. 2 is a schematic representation of the processor of the device of Fig.

Processing device 2 comprises a processor 15, illustrated schematically in FIG. 2. Processor 15 processes incoming video data and generates outgoing video data, as will be explained in more detail hereinbelow.

Both analog and digital data are suitable for incoming and outgoing video data. According to one embodiment of the invention, incoming analog data is converted into digital data by an analog to digital (A/D) converter 17 before being processed by the processor 15. According to another embodiment of the invention, outgoing digital data from processor 15 is converted to analog data by a digital to analog (D/A) converter 18.

Figure 3:
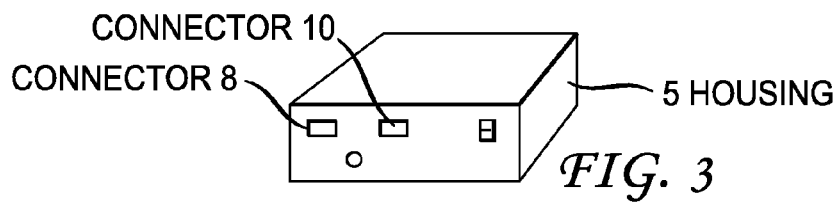
FIG. 3 is a partial schematic representation of the back of the device of FIG. 1.

FIG. 3 illustrates an example of a housing 5 according to an embodiment of the invention. Housing 5 comprises, on its front face, for example, at least a first connector 8 for connecting a cable 9 linking source 3 to case 5 (illustrated in FIG. 1), and a second connector 10 for connecting a cable 11 linking case 5 to projector 4. These cables 9 and 11 can comprise plural electrical or optical conductors.

The outgoing video data is digital according to one embodiment of the invention. According to alternative embodiments of the invention the outgoing digital data is analog. Further embodiments include outputs selectable between digital and analog. For an analog output, D/A convereter 18 converts outgoing data from digital to analog format.

According to one embodiment of the invention, processing device 2 comprises, for example on the front face of case 5, an indicator 12. Indicator 12 comprises, for example, at least one light-emitting element, e.g., a light emitting diode, whose illumination is controlled by processor 15. Indicator 12 indicates ambient light conditions. For example, in one embodiment, indicator 12 informs the user that certain ambient light conditions for showing a film under good conditions are met. In other words, the user is provided with an indication that the ambient light level is acceptable.

According to one embodiment of the invention, processing device 2 measures the ambient light level by means of detecting element 6. Processor 2 compares the light level detected by detecting element 6 with reference data stored in processor 15. Based on the comparison, if processor 2 determines the ambient lighting is within an acceptable range to provide an acceptable projection quality, the user is informed via indicator 12.

In a particular implementation example of the invention, two luminosity measurements are performed to determine if ambient lighting is within a range to provide an acceptable projection quality. Detecting element 6 is used to take a first measurement with respect to the screen. The first measurement is taken when the projector 4 is "off", that is, no image is being projected. The first measurement is stored by processor 2 in a memory. A second measurement with respect to the screen is taken using detecting element 6. The second measurement is taken when a predetermined image, for example, a test image, is being sent by processing device 2 to the display device, for example, projector 4 and projected onto the screen, thus illuminating detecting element 6. Based on the first and second measurements, processor 2 determines the relationship, on the screen, between ambient luminosity and luminosity due to the projected image. Therefore according to one embodiment of the invention, processor 2 determines an acceptable level of ambient lighting based upon the luminosity of the projector.

Thus, the acceptable level of ambient light is in most cases not as high for low-brightness projectors as it is for very bright projectors. Thus, the information supplied by indicator 12, in some embodiments of the invention, depends on the particular projector 4 being used.

In one embodiment of the invention, processing device 2 comprises a display 13 to inform the user of at least one step to be taken to improve projection quality. For example, display 13 informs the user that darkening the projection room further or changing the luminosity or contrast of the projector 4 are steps to improve projection quality.

In another embodiment of the invention, processing device 2 accounts for ambient luminosity in processing the incoming video data, for example so as to brighten the images on the screen when necessary.

According to another embodiment of the invention, processing device 2 is configured to determine the calorimetric response of projector 4. To determine a colorimetric response of projector 4, processor 15 sends reference data to projector 4 and at least one measurement is performed on the projected image by means of detecting element 6.

In one embodiment of the invention, processor 15 is configured, for example, to successively project at least two different colors so as to fill at least a portion of the screen. For example, a white background, a red background, a green background and a blue background are successively projected and at least one measurement is made from each projected image by means of the detecting element 6.

In another embodiment of the invention, Processor 15 is configured so that sequences of images are projected for each color, the luminous intensity of the images in each sequence varying from one image to the next. According to one embodiment of the invention, detecting element 6 is fixed during the measurement. According to another embodiment of the invention, detecting element 6 is movable during the measurements.

In another embodiment of the invention, device 2 provides a display comprising a chart. The chart comprises a plurality of colors. Alternatively, the chart comprises a single color with a plurality of regions corresponding to different characteristics, for example, saturations and luminosities. Detecting element 6 is moved over the screen to perform a measurement in each region.

According to one embodiment of the invention, detecting element 6 is configured, for example, to measure the calorimetric coordinates of the color of at least one region of the projected image. Detecting element 6 provides the resulting information to processor 15. Processor 15, determines, for example by comparison with the reference data sent to the projector, the colorimetric difference between the color of the image as it appears on the screen and that which would have been obtained if the response of the projector had followed a predetermined law. Processor 15 thus determines the response of the projector and calculates a correction function that is used to modify the rendering of the projected images in a predetermined manner.

According to a further embodiment of the invention, plural measurements are made with detecting element 6 at various points on an image that correspond to a solid background, in order, for example, to determine the variation of luminosity or color at different points on the image and to enable processor 15 to take this into account when processing the incoming video data.

It is to be understood that various implementations of the invention will vary the physical location of processing device 2. Therefore, the location of device 2 is not limited to the exact configuration illustrated in FIG. 1. Processing device 2 is capable of location, and manufacture, at least in part, within other components of system 100. Suitable system components for implementing device 2 include source 3, projector 4 and various combinations thereof.

Likewise suitable housing means for the electronic circuits housed by housing 5 include housings of source 3 and projector 4. Likewise, the electronic circuits of source 3 and projector 4 are suitable for modification to perform at least some of the functions of processing device 2.

In one embodiment of the invention, once the response of projector 4 has been determined, processor 15 factors in the response of the projector when processing the incoming video data, in order to project a corrected image whose rendering is closer to a desired rendering, for example, to a rendering desired by the director of the film being projected.

In one embodiment of the invention, processor 15 processes the incoming video data in such a way that the combined response of processing device 2 and projector 4 substantially matches the response of the projector used when the director approved the film in the laboratory.

According to one embodiment for the processing described above, processor 15 processes the incoming video data according to a color table, also known as an LUT [look-up table]. The LUT comprises variables whose values are based upon the response of projector 4. A color table, according to various embodiments of the invention, comprises a plurality of dimensions, for example three dimensions. In some embodiments, the color table is capable of showing the influence of colors on one another.

According to one embodiment of the invention, data concerning the rendering desired by the director is transmitted to processing device 2 by source 3. In one embodiment of the invention, these data are recorded on the DVD optical disk, for example. In this case, processor 15 processes the incoming video data based upon the response of projector 4 such that the rendering on the display corresponds to that desired by the director.

According to one embodiment of the invention, processing device 2 further comprises a selector 16 that enables the user to choose among plural different renderings. Selectable renderings include, for example, tonalities (warm, cool), and selectable types of silver film.

According to another embodiment of the invention, processor 15 converts the incoming video data into outgoing video data as a function of at least one item of information input by a user, for example by means of selector 16. Therefore, in some embodiments of the invention, do not rely on a detector 6.

Figure 4:
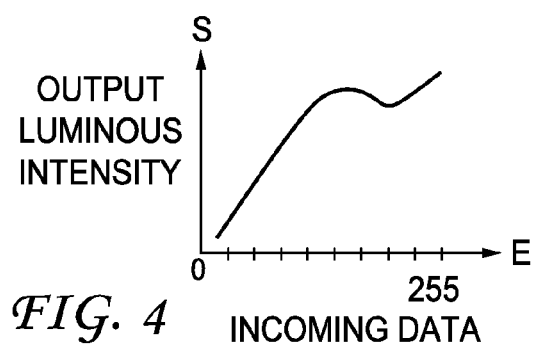
FIG. 4 shows an example of the response curve of a display device.

FIG. 4 is a schematic representation of a response curve of the display device for a given color. This curve represents, for example, the output luminous intensity S or the screen as a function of the incoming data E, encoded, for example in eight bits, i.e. between the values 0 and 255.

In an example embodiment, the user performs an action that, for at least two different incoming values E, modifies the corresponding output values S.

Accordingly, embodiments of the selector 16 illustrated in FIG. 1 comprise three rows of control buttons, each row corresponding to a color, the buttons in a single row being used to modify the response curve for the color concerned, somewhat like adjusting an equalizer.

In some example embodiments, the intensity of a selected color is modified respectively for dim and bright light. This provides the image with first and second tonalities corresponding respectively to bright and in dim light, for example.

While foregoing is directed to the preferred embodiments of the present invention, other and further embodiments of the invention may be devised without departing from the basic scope thereof, and the scope thereof is determined by the claims that follow.

The invention claimed is:

1. A video system comprising:
    at least one input for receiving incoming video data, said incoming video data described by first colorimetric data;
    at least one output for delivering outgoing video data to a display device, said outgoing data characterized by second colorimetric data;
    at least one detecting element for detecting at least one displayed colorimetric characteristic of an image displayed on said display device;
    at least one processor for converting said incoming video data into outgoing video data as a function of said at least one displayed colorimetric characteristic;
    a user control communicating with said at least one processor to allow said user to cause said processor to convert incoming video data into outgoing video data as a function of a color characteristic different from said at least one displayed colorimetric characteristic;
    an indicator in communication with said at least one processor and responsive to the at least one displayed colorimetric characteristic for continuously indicating an ambient light condition of said video system; and
    display means, in communication with said at least one processor and responsive to the at least one processor determining a level of projection quality based upon the first colorimetric data and the at least one displayed colorimetric characteristic, for indicating a step for improving the level of projection quality, said step for improving related at least to an adjustment of said ambient light condition.

2. The video system of claim 1 wherein said at least one processor converts incoming data characterized by said first colorimetric data into outgoing data characterized by said second colorimetric data different from the first colorimetric data as a function of said at least one displayed colorimetric characteristic.

3. The video system of claim 1 wherein said first and second colorimetric data comprise first and second color spaces respectively.

4. The video system of claim 1 further comprising: a housing including at least two connectors coupled to said at least one processor for transmitting said incoming video data and said outgoing video data.

5. The video system of claim 1 wherein said at least one detecting element comprises a sensor.

6. The video system of claim 5 wherein said sensor is configured to measure red, green and blue levels of said image.

7. The video system of claim 1 wherein said at least one detecting element is movable in relation to said at least one processor.

8. The video system according to claim 1 further comprising a selector for selecting among a plurality of processing options for said incoming video data, in response to a rendering desired by a user.

9. The video system according to claim 1 wherein said at least one processor is configured to send reference data to said display device, said reference data corresponding to a reference image and permitting the display of at least one image on said display device, and said at least one processor is configured to determine the response of said display device as a function at least of one item of information transmitted by said at least one detecting element when the image is displayed.

10. The video system of claim 1 wherein said at least one detecting element communicates with said processor by a wireless link.

11. A home theater system, comprising:
    a video source:
    a projection system comprising a projector and a screen;
    a video processor for receiving data from said video source and transmitting the data, after processing, to said projector;
    at least one detecting element for performing a first luminosity measurement with respect to the screen while the projector is not projecting anything and a second luminosity measurement with respect to the screen with the projector projecting an image on the screen, said processor determining a relationship on the screen between the first and second luminosity measurements due to a projected image and determining an acceptable level of ambient lighting based on the second luminosity measurement of the projector; and
    a display means, in communication with said video processor and responsive to the video processor determining a level of projection quality based on the first and second luminosity measurements, for indicating a step for improving the level of projection quality, said step for improving related at least to an adjustment of said ambient light condition.

12. The home theater system according to claim 11, wherein the first luminosity measurement comprises an ambient luminosity on the screen.

13. The home theater system according to claim 11, wherein the second luminosity measurement comprises luminosity due to a projected image on the screen.

14. The home theater system according to claim 13, wherein the projected image comprises a test image.

15. The home theater system according to claim 11, wherein said adjustment of the ambient light condition includes at least one of darkening a projection room, changing a contrast of the projector, and changing a luminosity of the projector.

16. The home theater system according to claim 11, wherein the processor determines an acceptable level of ambient lighting based upon the second luminosity measurement of the projector.

* * * * *